UNITED STATES PATENT OFFICE.

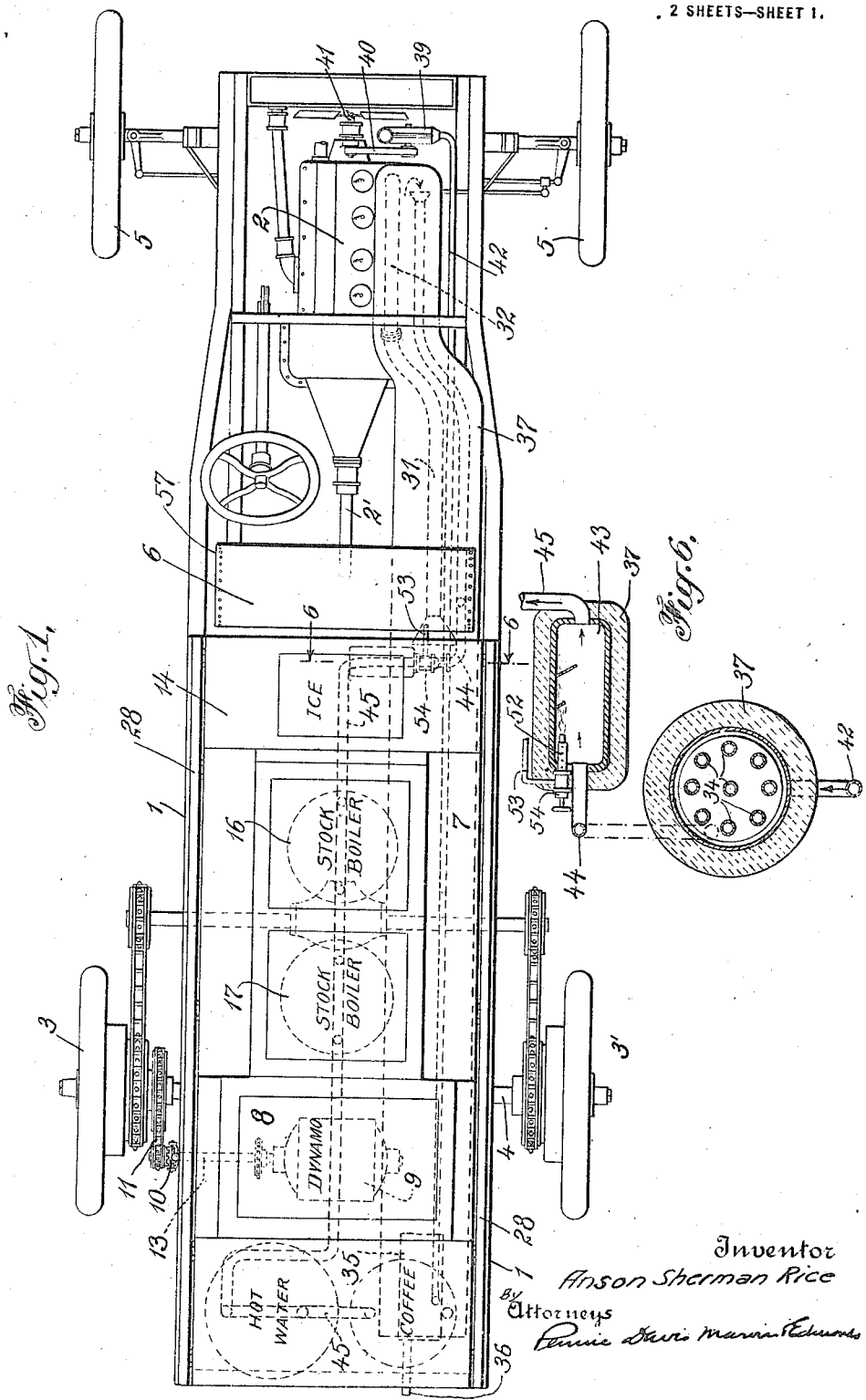

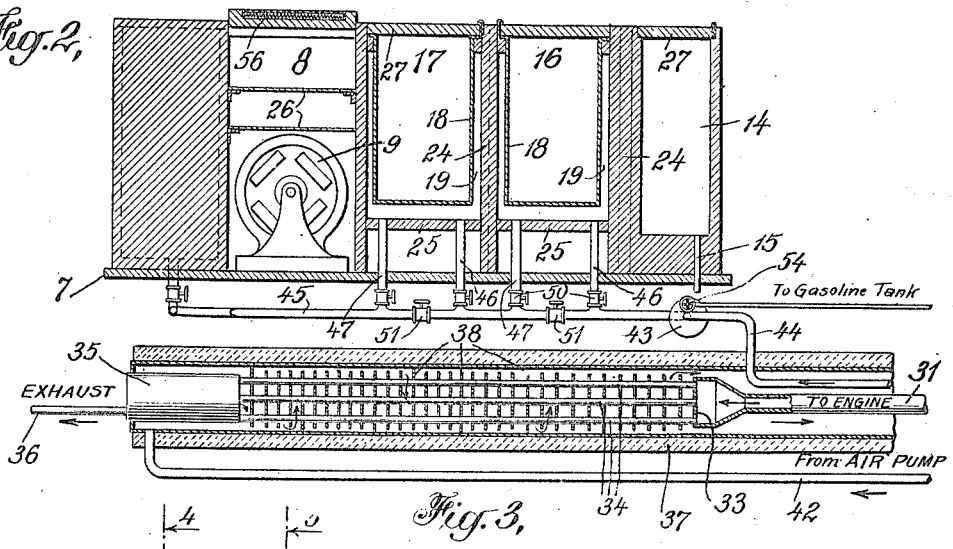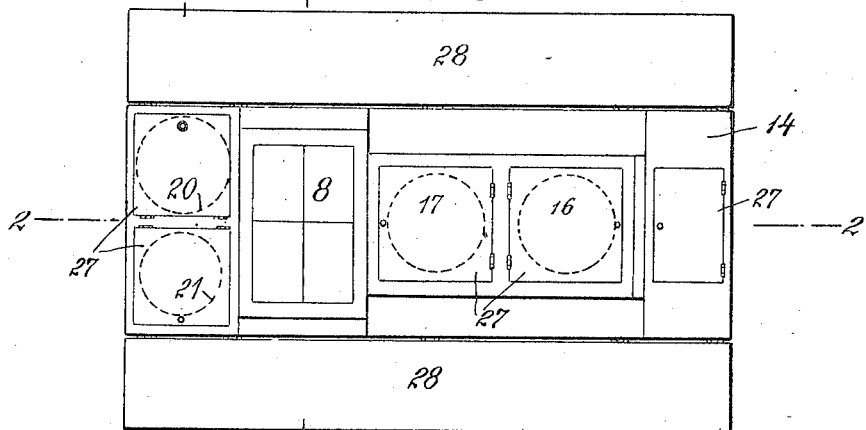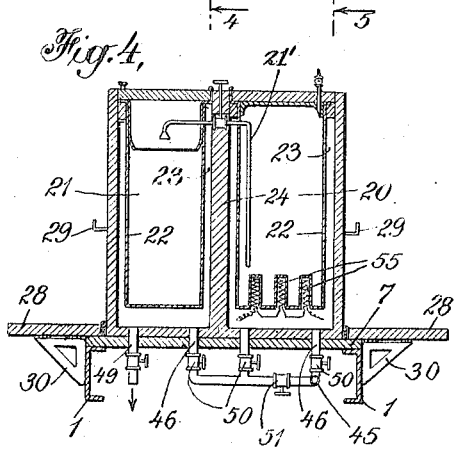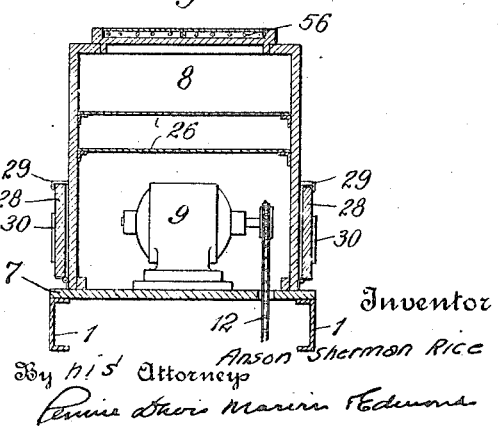

ANSON SHERMAN RICE, OF BROOKLYN, NEW YORK.

COOKING APPARATUS.

1,263,804.                     Specification of Letters Patent.       Patented Apr. 23, 1918.

Application filed June 5, 1917.   Serial No. 172,972.

*To all whom it may concern:*

Be it known that I, ANSON SHERMAN RICE, a citizen of the United States, residing at Brooklyn, in the county of Kings, State of New York, have invented certain new and useful Improvements in Cooking Apparatus; and I do hereby declare the following to be a full, clear, and exact description of the invention, such as will enable others skilled in the art to which it appertains to make and use the same.

The present invention is directed primarily to an arrangement wherein heat is extracted from the products of combustion of an internal combustion engine in a novel manner and is utilized, by itself or supplemented by heat from other means, for cooking apparatus in general, and the invention also comprehends an accessible and suitably distributed arrangement on the frame of a moving vehicle of cooking and storage compartments, wherein heat obtained in that or in any other suitable way is utilized for cooking food or keeping food hot during transport or at rest.

I have discovered that a large part of the heat in the exhaust gases of an internal combustion engine may be extracted continuously during the operation of the engine by circulating a current of air, preferably by means of a blower, over the exhaust pipe of the engine, and that the air so heated, and further heated, if necessary, by supplemental heating means, is suitable for cooking purposes in general, such as for cooking or dehydrating food, or keeping food hot for subsequent use, in stationary kitchens, and also on moving vehicles. The amount of heat so extracted may be increased by surrounding the exhaust manifold of the engine, as well as the exhaust pipe and muffler, with a conduit for the current of air; and also by causing the air to flow in a circuitous path along the exhaust pipe. Furthermore, the heat is extracted more effectively, and is therefore more suitable for cooking purposes, when the air is directed from the rear end of the exhaust pipe where the exhaust gases are coolest, toward the exhaust manifold, where they are hottest, and also by dividing the usual single exhaust pipe into two or more exhaust pipes so as to increase the surface area to which the exhaust gases are exposed to the air.

The heat extracted from the products of combustion in this or any other suitable way may be supplemented, if desired, by heat from other heating means. For instance, a current of air produced by a blower may pass into a combustion chamber in which any suitable kind of fuel supplied thereto is burned in the current of air, or in conductive relation thereto, the air being preliminarily heated by the products of combustion of the engine and thereby increasing the efficiency of the combustion chamber. Furthermore, an electric generator, adapted to be connected to the engine for lighting or other purposes, may supply electric current to a resistance heating unit in the cooking compartment or compartments, or elsewhere, to supplement the other heating means.

In case the cooking compartments are mounted on the frame of a moving vehicle, such as an automobile or a trailer, the storage and cooking compartments extend over substantially the full width of the vehicle body and over the entire length thereof behind the driver's seat so as to occupy to advantage all of the available space. Those compartments may have top covers which are rendered accessible by means of side platforms, but in order not to interfere with the transport of the vehicle on any road, the said platforms are preferably collapsible so as, when collapsed, to lie against the sides of the compartments within the clearance line of the vehicle. A suitable arrangement for accessibility and the proper distribution of weight on the chassis of an automobile is obtained by having the generator compartment in proximity to the rear axle so as to provide simple driving means for the generator therein, an icebox directly behind the driver's seat and cooking compartments to the front and rear of the generator compartment, the collapsible side platforms extending substantially the full length of the tonneau behind the driver's seat.

The accompanying drawings illustrate the preferred form of my invention in application, as an example, to an automobile for transport service.

In these drawings,

Figure 1 is a plan view of the automobile; Fig. 2 is a section on line 2—2 of Fig. 3; Fig. 3 is a plan view of the cooking and storage compartments with the side platforms lowered; Fig. 4 is a section on line 4—4 of Fig. 3; Fig. 5 is a section on line 5—5 of Fig. 3, but with the side platforms collapsed; and Fig. 6 is a section on line 6—6 of Fig. 1.

The automobile has a chassis comprising the usual frame members 1, internal combustion engine 2 and transmission 2', driving wheels 3 and 3' on the rear axle 4, and steering wheels 5. The tonneau has a driver's seat 6 and a number of compartments extending for substantially the full length and width of the floor 7. The generator compartment 8 is located in proximity to the rear axle 4 so as to be in convenient position for driving the generator 9 therein. The clutch 10 provides means for driving the generator at will from the wheel 3, by means of the chains 11 and 12 of the counter shaft 13. The compartment 14, located directly behind the driver's seat 6, is adapted to contain ice and has a waste pipe 15. Each of the two compartments 16 and 17 between the ice and generator compartments has a metal cooking vessel 18 providing an inclosed air space 19 around its sides and bottom. The compartments 20 and 21 have a coffee percolator and a water boiler with a valved overflow pipe 21' therefor, the metal vessel 22 providing an inclosed air space 23 in each compartment.

The foregoing arrangement of compartments nicely utilizes the available space over the frame and provides the proper balance of the weight on the chassis. Each of the compartments is incased by heat-insulating partitions 24. The partitions 25 furnish closet space below the compartments 16 and 17 and the shelves 26 in the generator compartment provide a switch compartment for the generator and space for cooking utensils. The storage and cooking compartments 14, 16, 17, 20 and 21 have heat-insulating hinged covers 27 which are accessible to an attendant standing on either of the side platforms 28 when in lowered position, as shown in Figs. 3 and 4. When not in use, as when the automobile is in transport, the platforms are held in raised position within the clearance line of the tonneau by suitable hooks 29 and the supports 30 are turned, as shown in Fig. 5, to lie flat against the collapsed platforms.

The pipe 31 connects the exhaust manifold 32 of the engine to the exhaust header 33. A plurality of circularly-arranged exhaust pipes 34 extend from the header to the muffler 35, which communicates with the external atmosphere through the pipe 36. A heat-insulated conduit 37 surrounds the exhaust manifold 32, the exhaust pipes 31 and 34 and the muffler 35, and contains staggered baffles 38 providing a circuitous air path along and across the pipes 34. The air blower 39 driven from the engine by the belt 40 extending from the fan shaft 41, is connected to the rear end of the conduit 37 by the pipe 42. The combustion chamber 43 is connected on one side to the front end of the conduit by the air pipe 44 and on the other side to the air supply main 45.

The inlet pipes 46 extend from the main 45 into the air space of the compartments 16, 17, 20 and 21, and the outlet pipes 47 thereof extend back to the main. The coffee compartment 21 has an inlet 46 from the main and an outlet 49 to the external atmosphere. Each of the inlets and outlets contains a valve 50 and the main is provided with a valve 51 between the inlet and outlet of each of the compartments 16, 17 and 20.

The gasolene burner 52 for the combustion chamber 43 is supplied from the fuel tank 57 through the supply pipe 53 and valve 54. The resistance heating units 55 in the water boiler, and likewise the unit 56 in the cover of compartment 8 to form a hot plate, may be supplied with electric current from the generator 9.

When the engine is in operation, the blower 39 forces a current of air through conduit 37 and combustion chamber 43 to the supply main 45. That air, heated by the products of combustion of the engine, and also, if desired, by a regulated amount of burning gasolene in the combustion chamber 43, passes into and out of the spaces 19 and 23 of the cooking compartments in amounts regulated, as will be understood, by the valves 50 and 51. That air may be further heated, if desired, by the resistance heating units supplied with current from the generator 9, which is driven from the rear wheel 3 when the automobile is in transit or at rest with the wheel 3 jacked-up off the ground.

As disclosed by the foregoing, I have provided an arrangement wherein heat extracted in a novel manner from the products of combustion of an internal combustion engine may be utilized, either alone or supplemented by other heating means, for cooking compartments for cooking purposes in general such as for cooking or dehydrating food or keeping food hot in stationary kitchens or on moving vehicles; and I have specifically disclosed an automobile wherein cooking and storage compartments are accessibly arranged in the tonneau in such manner as to utilize substantially the entire available space with a suitable distribution of the weight on the chassis and to be associated with heating means in which the heat is supplied in part or entirely from the exhaust gases of the internal combustion engine driving the automobile.

Having thus described my invention, what I claim is:

1. The combination with an internal combustion engine having an exhaust pipe, of a cooking compartment, a conduit surrounding the exhaust pipe, a plurality of staggered baffles providing a circuitous air path along the exhaust pipe, and a blower and pipes for circulating air through the conduit and into the cooking compartment.

2. The combination with an internal combustion engine; of a cooking compartment; a conduit surrounding the exhaust manifold, the muffler and the exhaust pipe therebetween; and a blower and pipes for circulating air through the conduit into the cooking compartment.

3. The combination with an internal combustion engine, of a cooking compartment, a conduit surrounding the exhaust pipe of the engine, a blower, an air pipe extending from the blower to the rear end of the conduit, and an air pipe extending from the front end of the conduit to the cooking compartment.

4. The combination with an internal combustion engine, of a cooking compartment, an air blower, means for directing the current of air from the blower to extract heat from the products of combustion of the engine and to transfer the heat to the cooking compartment, and supplemental heating means for the current of air.

5. The combination with an internal combustion engine, of a cooking compartment, a conduit surrounding the exhaust pipe of the engine, a blower and pipes for circulating the air through the conduit in the cooking compartment, and supplemental heating means for the air.

6. The combination with an internal combustion engine, of a cooking compartment, a blower for circulating air to extract heat from the products of combustion of the engine, supplemental heating means for the air, and a conduit to conduct air, heated by the products of combustion, to the supplemental heating means and thence to the cooking compartment.

7. The combination with an internal combustion engine, of a cooking compartment, a blower for circulating air to extract heat from the products of combustion of the engine and to transfer it to the cooking compartment, and means for supplying regulatable amounts of additional heat to the air.

8. The combination with an internal combustion engine, of a cooking compartment, an air blower, a combustion chamber, air pipes connecting the combustion chamber with the blower and with the cooking compartment, and means for supplying regulatable amounts of fuel to the combustion chamber for combustion with the air supplied thereto by the blower.

9. The combination with an internal combustion engine, of a cooking compartment, an air blower, a conduit surrounding the exhaust duct of the engine, a combustion chamber, air pipes for conducting air from the blower to the cooking compartment through the conduit and the combustion chamber, whereby the air is heated prior to entry into the combustion chamber, and means for supplying fuel to the combustion chamber, for combustion with the heated air supplied thereto by the blower.

10. The combination with an automobile chassis, of a cooking compartment mounted thereon, a blower and pipes for directing a current of heated air to the cooking compartment, a resistance heating unit arranged to further heat the current of air, and an electric generator adapted to be mechanically connected to the engine to furnish current to the resistance unit.

11. The combination with an automobile chassis, of a cooking compartment mounted thereon and having a heating chamber, a resistance heating unit in the heating chamber, a blower and pipes for directing heated air to the heating chamber, and an electric generator adapted to be mechanically connected to the engine to furnish current to the resistance unit.

12. A transportable kitchen having storage and cooking compartments extending over substantially the full width of the vehicle body, means for heating the cooking compartments, and a collapsible side platform which, when in position, provides access to all of said compartments, and which, when collapsed, lies within the clearance line of the vehicle; substantially as described.

13. A transportable kitchen having storage and cooking compartments with top covers and extending over substantially the full width of the vehicle body, means for heating the cooking compartments, and collapsible side platforms which, when in position, furnish access to all of said covers, and which, when collapsed, lie against the sides of the compartments within the clearance line of the vehicle; substantially as described.

14. The combination with an automobile chassis; of a tonneau having a driver's seat; and a kitchen comprising an electric generator compartment in proximity to the rear axle, an icebox directly behind the seat, a plurality of cooking compartments between the icebox and the generator compartment, a plurality of cooking compartments behind the generator compartment, and collapsible side platforms extending substantially the full length of the tonneau behind the driver's seat; the cooking compartments and the icebox being incased with heat insulating material and having top covers accessible from the side platforms.

In testimony whereof I affix my signature.

ANSON SHERMAN RICE.